United States Patent [19]
McKee

[11] 4,077,131
[45] Mar. 7, 1978

[54] MAGNETIC COMPASS ARRANGEMENTS
[75] Inventor: Frederick Brian McKee, Burnham-on-Crouch, England
[73] Assignee: The Marconi Company Limited, England
[21] Appl. No.: 707,009
[22] Filed: Jul. 20, 1976
[51] Int. Cl.² ............ G01C 17/18; G01C 17/26; G01C 17/38
[52] U.S. Cl. .................... 33/356; 33/363 K
[58] Field of Search ............ 33/355 R, 355 D, 356, 33/363 K

[56] References Cited
U.S. PATENT DOCUMENTS
2,490,102  12/1949  Stein .................... 33/355 R FOREIGN PATENT DOCUMENTS
226,034  9/1910  Germany .................... 33/356

Primary Examiner—Richard E. Aegerter
Assistant Examiner—Richard R. Stearns
Attorney, Agent, or Firm—Diller, Brown, Ramik & Wight

[57] ABSTRACT

A magnetic compass arrangement for use on a road vehicle consists of two magnets mounted so that tilt or acceleration of the vehicle produces equal and opposite errors in them. The errors are cancelled and a substantially error free output signal representative of direction is provided.

4 Claims, 3 Drawing Figures

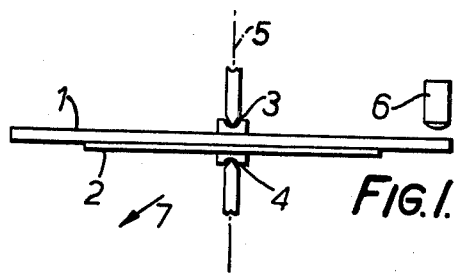
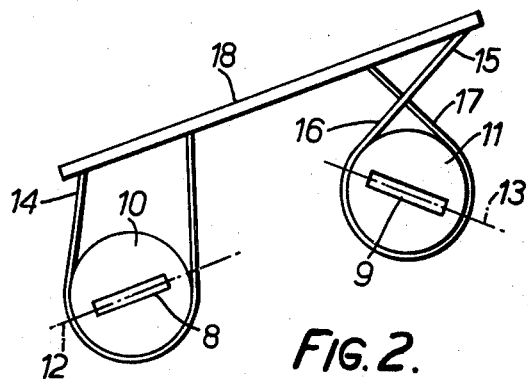
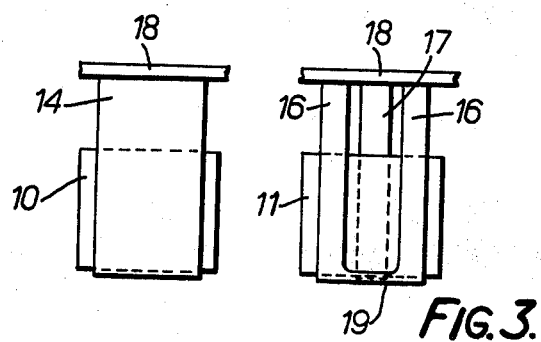

MAGNETIC COMPASS ARRANGEMENTS

This invention relates to magnetic compass arrangements. Although magnetic compasses are used extensively as a means for indicating direction, it has proved difficult to provide a magnetic compass arrangement in which the bearing given by the compass can be accurately translated into an electrical signal. The single-pivot magnetic compass, that is to say a compass in which the rotatable magnet compass card is supported by a single pivot, is particularly unsatisfactory since the magnet is permitted to incline or dip in accordance with the vertical component of the earths magnetic field as well as rotate according to the required turning movement which indicates the bearing. The additional dipping movement of the magnet compass card makes it very difficult to provide sensors which respond accurately only to desired rotational movements, and for this reason the present invention is concerned only with double-pivot magnetic compass arrangements which constrain the magnet to rotate in a single plane relative to the compass housing. If however, this plane is allowed to tilt the bearing indicated changes thereby introducing serious errors. The present invention seeks to provide a double-pivot magnetic compass arrangement in which such errors are reduced.

According to this invention a magnetic compass arrangement includes means for producing equal and opposite tilting movements in response to an overall tilt imposed on the magnetic compass arrangement, and means applying the equal and opposite tilting movements to each of two compass cards respectively, such that the bearing errors of each are also equal and opposite, and means for producing cancellation of these errors.

Preferably the bearing given by each of said two compass cards is sensed optically. The use of optical means to sense the bearing indicated is preferable to any mechanical coupling arrangement since it avoids risk of imposing mechanical drag on the compass movement.

Preferably again electrical signals representative of the bearings are obtained from the optical sensors, and combined to produce a signal representative of the mean value of the bearings indicated by the two compass cards.

In the absence of any overall tilt, both compass cards will indicate identical bearings, but in the presence of an overall tilt, the bearings indicated will depart from the true value by equal and opposite amounts.

The invention is primarily intended for use with road vehicles, although the invention is equally applicable for use with other kinds of vehicles. In the case of road vehicles, a significant tilt can be introduced by cambered road surfaces, and by suspension movement during cornering.

The invention is further described by way of example with reference to the accompanying drawings in which FIG. 1 shows a double-pivot magnetic compass and an optical sensor head for sensing the bearing indicated by the compass card.

FIG. 2 shows in simplified diagrammatic form a double-pivot magnetic compass arrangement in accordance with the present invention, FIG. 3 shows a detail side view of this arrangement.

With reference to FIG. 1, there is shown therein a double pivot magnetic compass consisting of a rotatable card 1 carrying a compass magnet 2 and supported between two pivots 3 and 4, so that the axis 5 of rotation of the card 1 is vertical. The card carries bearing information (not shown) on its upper surface which is read off by an optical sensor 6. In practice the compass is mounted on a road vehicle, and as the vehicle changes direction, the corresponding rotation of the card 1 relative to the vehicle is detected by the sensor 6. In general, at the surface of the earth, the earth's magnetic field includes a strong vertical component (only at the magnetic equator is it absent), and the actual direction of the earth's magnetic field is represented by the arrow 7.

If the heading of a vehicle carrying such a compass remains constant, but the compass is tilted, the vertical component of the earth's magnetic field causes rotation of the compass card which results in an erroneous bearing being indicated. Such tilting will be present if the vehicle is driven along a road with a cambered surface for example, or is driven up or down a hill.

FIG. 2 shows in simplified form a way in which this problem is dealt with.

Double pivot magnetic compasses 8 or 9, each of which is like the structure shown in FIG. 1, are mounted within the hollow cylinders 10, 11 respectively with the plane of the compass cards shown by the broken lines 12, 13. The pivots are fixedly mounted within the cylinders 10, 11 so that rotation of the cylinders causes tilting of the planes of the compass cards. Each cylinder 10, 11 is suspended by a flexible belt 14, 15 from a support 18 which, in practice is, rigidly fixed to the vehicle (not shown). Belt 14 is a simple belt of uniform width, but belt 15 is more complicated, and is best seen in FIG. 3. The part 16 of the belt 15 consists of two parallel bands spaced apart, and the part 17 consists of a thin central band which is joined by a wide section 19 to the two bands of the part 16 at the lowermost region of the cylinder.

Initially with support 18 horizontal, broken lines 12 and 13 are also both horizontal, but as the support 18 is tilted as shown, the hollow cylinders 10 and 11 are caused to rotate by equal amounts, but in opposite directions. This causes equal and opposite bearing errors in compasses 8 and 9, and the signals given out by the optical sensors associated with each compass are combined to eliminate the error. This is simply done by taking the mean, or average, of the two signals. Thus if the tilting occurs whilst the vehicle maintains a constant heading, no overall change in output signal occurs.

As so far described, compensation is provided for tilting which occurs in only a single plane. It should be noted that as the belts 14 and 15 are flexible, they will be affected by acceleration forces and may swing slightly from side to side with the motion of a compound pendulum. Again, since such movements cause equal and opposite rotation of the cylinders 10 and 11 this effect is cancelled from the output signal.

I claim:

1. A magnetic compass arrangement including two compass cards, means separately mounting said compass cards to a common support member for producing equal and opposite tilting movements of said compass cards in response to an overall tilt imposed on the magnetic compass arrangement, such that the bearing errors due to tilt of each are substantially equal and opposite, and means for sensing the bearing of each compass card and producing an output related thereto, and means for combining the outputs of said sensing means to produce an output substantially eliminating said errors.

2. A magnetic compass arrangement as claimed in claim 1 and wherein said sensing means comprises optical sensors provided to sense the bearing given by each of said two compass cards.

3. A magnetic compass arrangement as claimed in claim 2 and wherein electrical signals representative of the bearings are obtained from the optical sensors, and combined to produce a signal representative of the mean value of the bearings indicated by the two compass cards.

4. A magnetic compass arrangement as claimed in claim 1 wherein the means for producing equal and opposite tilting movements comprises a pair of flexible suspension members, one of which is capable of producing a tilt of the same sense as said imposed overall tilt, and the other of which, by virtue of a cross-over in the flexible suspension member is capable of producing a tilt of the opposite sense.

* * * * *